United States Patent
Goodwin et al.

(10) Patent No.: US 7,861,820 B1
(45) Date of Patent: Jan. 4, 2011

(54) ELECTRONICALLY STEERED AND SPRUNG IDLER ASSEMBLY

(75) Inventors: Christopher J. Goodwin, Greenville, NC (US); Gregory S. Roman, Greenville, NC (US)

(73) Assignee: NMHG Oregon, LLC, Portland, OR (US)

( * ) Notice: Subject to any disclaimer, the term of this patent is extended or adjusted under 35 U.S.C. 154(b) by 554 days.

(21) Appl. No.: 11/828,991

(22) Filed: Jul. 26, 2007

(51) Int. Cl.
    *B62D 61/06* (2006.01)
(52) U.S. Cl. ...................................... 180/411; 180/408
(58) Field of Classification Search ................. 180/411, 180/408
    See application file for complete search history.

(56) References Cited

U.S. PATENT DOCUMENTS

| | | | | |
|---|---|---|---|---|
| 2,824,749 A * | 2/1958 | Yasuda | | 180/409 |
| 2,915,319 A * | 12/1959 | Kumler et al. | | 180/410 |
| 3,392,797 A * | 7/1968 | Gibson et al. | | 180/253 |
| 4,263,979 A * | 4/1981 | Sturgill | | 180/411 |
| 4,754,837 A * | 7/1988 | McCormick | | 180/253 |
| 4,813,512 A * | 3/1989 | McCormick | | 180/253 |
| 5,325,935 A * | 7/1994 | Hirooka et al. | | 180/211 |
| 5,685,555 A * | 11/1997 | McCormick et al. | | 280/6.157 |
| 6,125,963 A * | 10/2000 | Staiger | | 180/411 |
| 6,286,615 B1 * | 9/2001 | Bitelli | | 180/9.46 |
| 6,546,323 B2 * | 4/2003 | Deguchi et al. | | 701/41 |
| 6,615,944 B1 * | 9/2003 | Horwath et al. | | 180/204 |
| 6,827,176 B2 * | 12/2004 | Bean et al. | | 180/411 |
| 6,901,323 B2 * | 5/2005 | Kokura | | 701/50 |
| 7,077,232 B2 * | 7/2006 | Correia et al. | | 180/410 |
| 7,191,865 B2 * | 3/2007 | Spark | | 180/411 |
| 7,278,511 B1 * | 10/2007 | Gass et al. | | 180/409 |
| 7,464,785 B2 * | 12/2008 | Spark | | 180/236 |
| 7,520,362 B2 * | 4/2009 | Wierzba et al. | | 180/253 |
| 2003/0070862 A1 * | 4/2003 | Tartara | | 180/411 |
| 2004/0129491 A1 * | 7/2004 | Bean et al. | | 180/411 |
| 2005/0217906 A1 * | 10/2005 | Spark | | 180/22 |
| 2005/0236217 A1 * | 10/2005 | Koelin et al. | | 180/411 |

\* cited by examiner

*Primary Examiner*—Lesley Morris
*Assistant Examiner*—Michael R Stabley
(74) *Attorney, Agent, or Firm*—Stolowitz Ford Cowger LLP

(57) ABSTRACT

A steering system for an industrial vehicle includes a drive wheel configured to steerably align with a first radius of curvature. The steering system further includes an electronically controlled idler wheel configured to steerably align with a second radius of curvature different than the first radius of curvature. The first and second radii of curvature share a common center point of turning radius. A controller is configured to command the electronically controlled idler wheel to steerably align with the second radius of curvature according to a determination of the first radius of curvature.

21 Claims, 8 Drawing Sheets

| $\omega_1$ | $\omega_0$ | $\omega_1$ | $\omega_0$ |
|---|---|---|---|
| 0 | 0 | 5 | 5 |
| -5 | -5 | 10 | 9 |
| -10 | -11 | 15 | 13 |
| -15 | -17 | 20 | 17 |
| -20 | -24 | 25 | 21 |
| -25 | -32 | 30 | 24 |
| -30 | -40 | 35 | 27 |
| -35 | -49 | 40 | 30 |
| -40 | -57 | 45 | 33 |
| -45 | -65 | 50 | 36 |
| -50 | -73 | 55 | 39 |
| -55 | -81 | 60 | 42 |
| -60 | -88 | 65 | 45 |
| -65 | -34 | 70 | 48 |
| -70 | -100 | 75 | 51 |
| -75 | -105 | 80 | 54 |
| -80 | -110 | 85 | 58 |
| -85 | -114 | 90 | 62 |
|  |  | 95 | 66 |
|  |  | 100 | 70 |
|  |  | 105 | 75 |
|  |  | 110 | 80 |
|  |  | 115 | 86 |

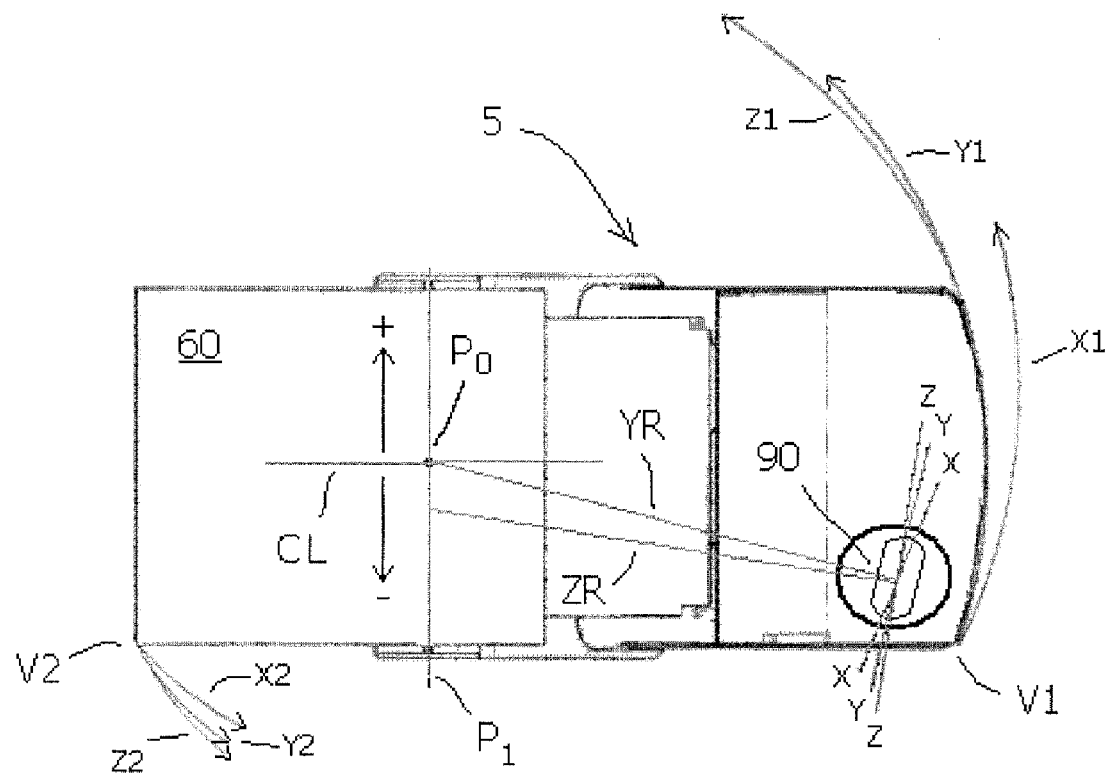
FIG. 6A
FIG. 6B
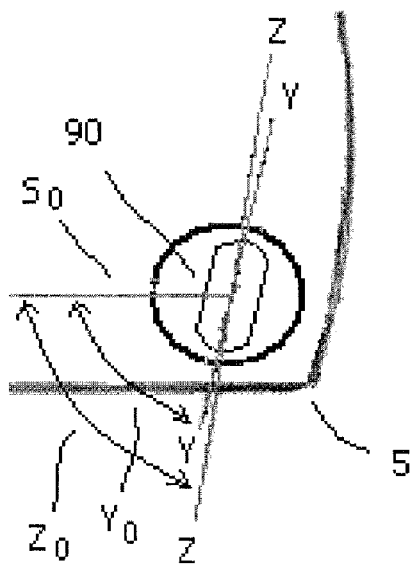

ELECTRONICALLY STEERED AND SPRUNG IDLER ASSEMBLY

BACKGROUND

Industrial vehicles, including forklift trucks known as narrow aisle or reach trucks, include steering systems designed for improved operation of the vehicle. Reach trucks are configured with front load wheels, a left rear drive wheel, and a right rear caster. With the front load wheels commonly fix mounted to straddle arms, vehicle suspension is accommodated by the rear wheel/caster to maintain drive wheel contact on uneven floors. Vehicle suspension is provided by an articulating rear axle or sprung caster assembly.

Whereas reach trucks include a drive wheel and caster, only the drive wheel is directly steered by the steering system. The caster is freely rotated and is provided with a rotational offset to allow a certain amount of self steering when the reach truck changes direction. While the caster rotates during a turning operation of the reach truck, it undergoes some lateral movement or "scrubbing" transverse to the direction of travel. This scrubbing causes the reach truck to temporarily move or lurch in a lateral direction, contrary to the desired direction of rotation, and results in a larger than desired turning radius of the reach truck.

Some steering systems include a mechanical linkage between the drive wheel and the caster. When the drive wheel is turned, the caster is also made to turn by way of the mechanical linkage. This may reduce an amount of delay of the caster to rotate to a new position, but introduces a complexity of mechanical linkage and added routine maintenance. Furthermore, the mechanical linkage requires a substantial amount of room within or underneath the reach truck which reduces the amount of space available to an operator, and may increase a step height of the operator compartment ingress. Increasing the step height introduces ergonomic issues for the operator.

Known mechanical linkage systems approximate the Ackerman design of steering geometry, where a mechanically steered caster is driven via linkage connected to the drive wheel. The mechanical linkage consists of multi bar linkage installed between the drive wheel and the caster. The drive wheel is controlled either hydraulically or electronically by an operator from a steer tiller control. The angle of the caster is then controlled by coordinated movement of the mechanical linkage system. The mechanical linkage systems are only able to approximate the Ackerman steering geometry through a full range of wheel and vehicle turning or steering. Coordination of the steering angles between the drive tire and caster becomes increasingly compromised as the vehicle steering system approaches a minimum or zero turning radius. A minimum turning radius is not attainable in both right and left steering directions with mechanical linkages due to physical constraints of the mechanical linkage.

The steer effort required to operate the mechanical steer system varies depending on the steering angle requested, as a result of changes in moment arm lengths of the linkage. The steer effort is also increased due to friction occurring at the linkage joints. The steering system inefficiencies result in inconsistent steering effort demands placed on the operator and on the steering motor. Increasing the steering force introduces ergonomic issues for the operator. The steering motor must be sized to compensate for the increased steer effort at increase steering requests, and may result in a larger steering motor. A larger steering motor may reduce the amount of space available in the operator compartment, or contribute to an increased step height of the operator compartment ingress.

The present invention addresses these and other problems.

SUMMARY OF THE INVENTION

A steering system for an industrial vehicle is herein disclosed as comprising a drive wheel configured to steerably align with a first radius of curvature. The steering system further includes an electronically controlled idler wheel configured to steerably align with a second radius of curvature different than the first radius of curvature. The first and second radii of curvature share a common center point of turning radius. A controller is configured to command the electronically controlled idler wheel to steerably align with the second radius of curvature according to a determination of the first radius of curvature A method of steering is herein disclosed as identifying a first steering angle position of a primary steer tire, where the first steering angle position associated with a first steering radius. A second steering angle position is computed for a secondary steer tire, where the second steering angle position associated with a second steering radius. The method further includes commanding the secondary steer tire to align with the second steering angle position, where the first and second steering radii share a common radial center point.

A computer-readable medium is disclosed with instructions stored thereon. The instructions include receiving a steering request and controlling the rotational position of a drive wheel. A first steering angle associated with the rotational position of the drive wheel is identified, where the first steering angle is further associated with a first steering radius. A second steering angle for an idler wheel is determined, where the second steering angle is associated with a second steering radius. The instructions further include commanding the idler wheel to align with the second steering angle, where the first and second steering radii share a common radial center point.

BRIEF DESCRIPTION OF THE DRAWINGS

FIG. 6A illustrates an example of controllably steering a vehicle in a counterclockwise direction.

FIG. 6B illustrates an enlarged partial view of the vehicle shown in FIG. 6A.

DETAILED DESCRIPTION

Figure 1:
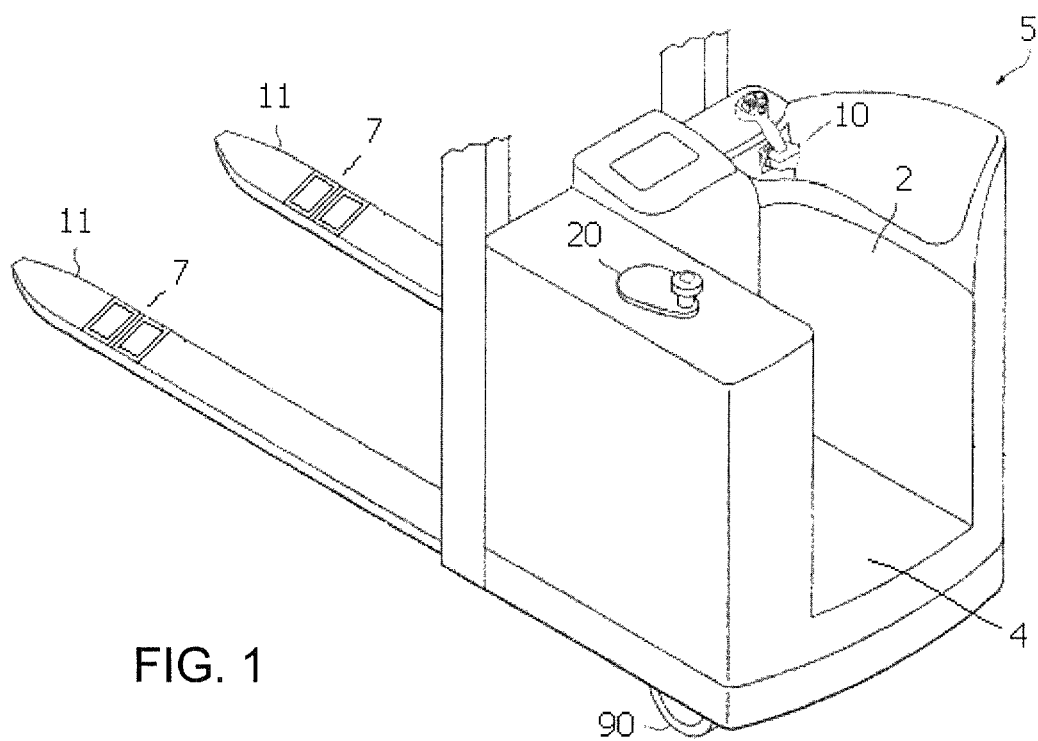
FIG. 1 is a rear isometric view of an industrial vehicle.

FIG. 1 is a rear isometric view of an industrial vehicle 5 such as a narrow aisle reach truck. The vehicle 5 is illustrated as including load arms 11, each of which has a load wheel assembly 7 attached thereto. The load wheel assembly 7 includes one or more load wheels or rollers which rotate about a substantially horizontal axis of rotation. A partial view of a drive wheel 90 is shown protruding from the bottom of the vehicle 5. The vehicle 5 further includes an operator station 2 to which is mounted a vehicle control handle 10 and a steering apparatus 20. The steering apparatus 20 is operable to command the drive wheel 90 to turn during a steering operation of the vehicle 5. The operator station 2 includes a floor plate 4 or step height accessible from an operator ingress.

Figure 2:
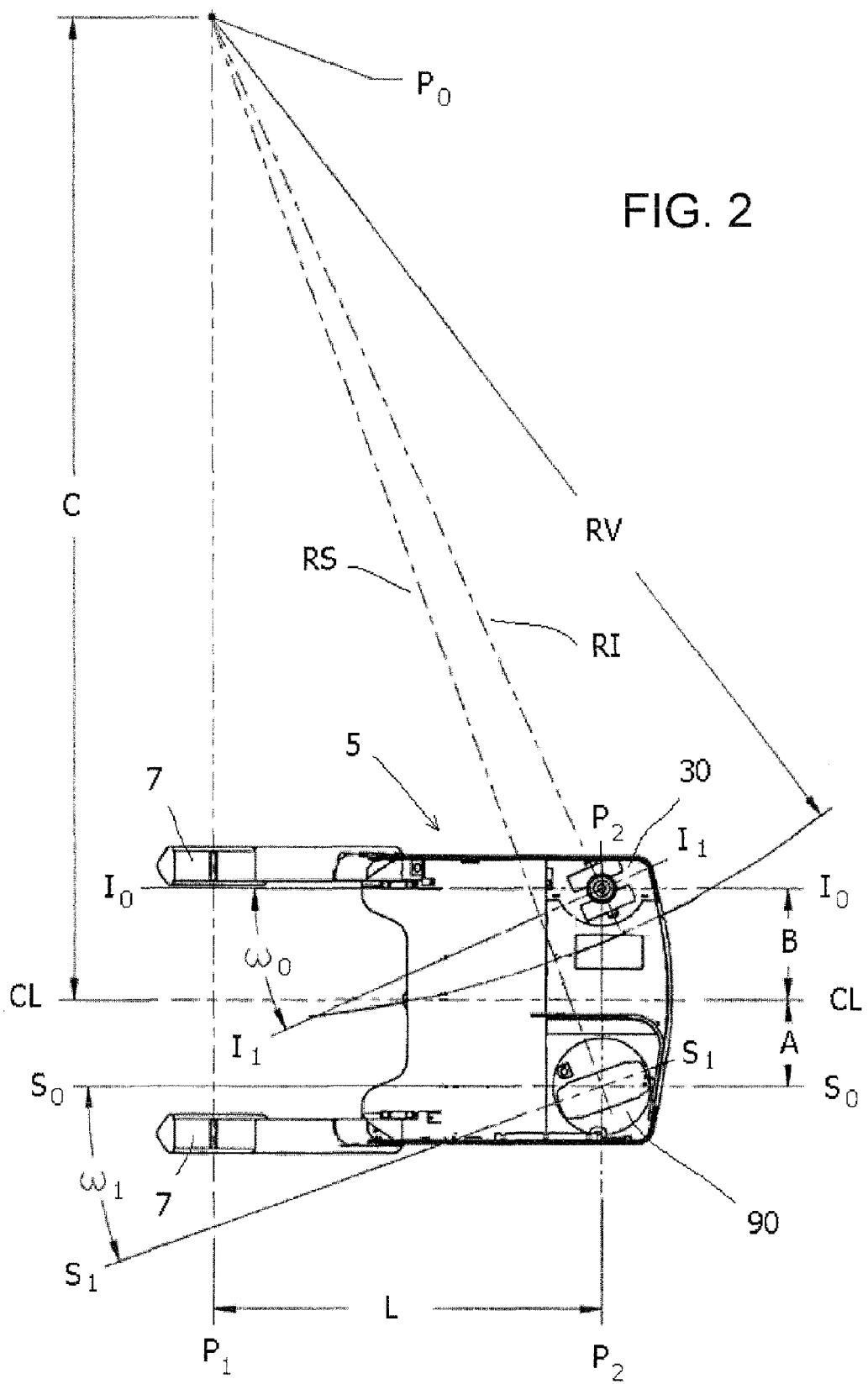
FIG. 2 is a top plan view illustrating turning geometries of the industrial vehicle of FIG. 1.

FIG. 2 is a top plan view illustrating example turning geometries of the industrial vehicle 5 of FIG. 1. The vehicle 5 is shown in outline form, with the drive wheel 90, load wheel assemblies 7 and an idler wheel 30 included for purposes of the description of the example turning geometries. The vehicle 5 is bisected by a longitudinal centerline CL. An idler wheel zero angle line $I_0$ passes through a center point of the idler wheel 30 and runs parallel to the vehicle centerline CL. An idler wheel steering direction line $I_1$ passes through the idler wheel center point and is oriented perpendicular to an axis of rotation of the idler wheel 30. A drive wheel zero angle line $S_0$ passes through a center point of the drive wheel 90 and also runs parallel to the vehicle centerline CL. A drive wheel steering direction line $S_1$ passes through the drive wheel center point and is oriented perpendicular to an axis of rotation of the drive wheel 90.

A load wheel assembly centerline $P_1$ is illustrated as passing through an approximate midpoint of load wheel assemblies 7. The load wheel assembly centerline $P_1$ runs parallel to an axis of rotation of one or more load rollers included in the load wheel assemblies 7. A rear wheel centerline $P_2$ is illustrated as passing through the axes of rotation of drive wheel 90 and idler wheel 30. In one embodiment, load wheel assembly centerline $P_1$ and rear wheel centerline $P_2$ are substantially parallel to each other, and run perpendicular to the vehicle centerline CL.

The distance between the load wheel assembly centerline $P_1$ and rear wheel centerline $P_2$ is identified as the wheel base L of the vehicle 5. In one embodiment, the axis of rotation of the drive wheel 90 and the axis of rotation of the idler wheel 30 are offset from each other in the longitudinal direction of the vehicle 5. In that case, the wheel base distance L, measured to the load wheel assembly centerline $P_1$, may be determined separately for each wheel 30, 90. The distance between the vertical axis of rotation of the idler wheel 30 and the vehicle centerline CL is identified as idler wheel distance B. The distance between the vertical axis of rotation of the drive wheel 90 and the vehicle centerline CL is identified as drive wheel distance A. In one embodiment, the wheel base L, the idler wheel distance B and the drive wheel distance A are fixed distances that do not vary during operation of the vehicle 5.

The idler wheel 30 is illustrated as being turned to a steer angle of $\omega_0$, which is defined as the angle formed between the idler wheel zero angle line $I_0$ and the idler wheel steering direction line $I_1$. The drive wheel 90 is illustrated as being turned to a steering angle of $\omega_1$, which is defined as the angle formed between the drive wheel zero angle line $S_0$ and the drive wheel steering direction line $S_1$. With the vehicle 5 traveling in a forward direction towards the load wheel assemblies 7 and the idler and drive wheels 30, 90 turned to steering angles $\omega_0$, $\omega_1$ respectively, the vehicle 5 would turn to the right in a clockwise orientation. In one embodiment, an approximate center point CP of the vehicle 5, identified as a point residing on the centerline CL and at one half the distance of the wheelbase L, would follow an arc identified as vehicle turning radius RV.

The drive wheel 90 turned to the steering angle $\omega_1$ follows an arc identified by a drive wheel turning radius RS. The drive wheel 90 may be configured to steerably align its horizontal axis of rotation with the drive wheel turning radius RS. The idler wheel 30 turned to the steering angle $\omega_0$ follows an arc identified by an idler wheel turning radius RI. The idler wheel may be configured to steerably align its horizontal axis of rotation with the idler wheel turning radius RI, which may be a different value than the drive wheel turning radius RS. In one embodiment, the vehicle turning radius RV, the idler wheel turning radius RI and the drive wheel turning radius RS all share a common radial center point $P_O$. The load wheel centerline $P_1$ is also shown as intersecting the common radial center point $P_O$.

Figure 3A:
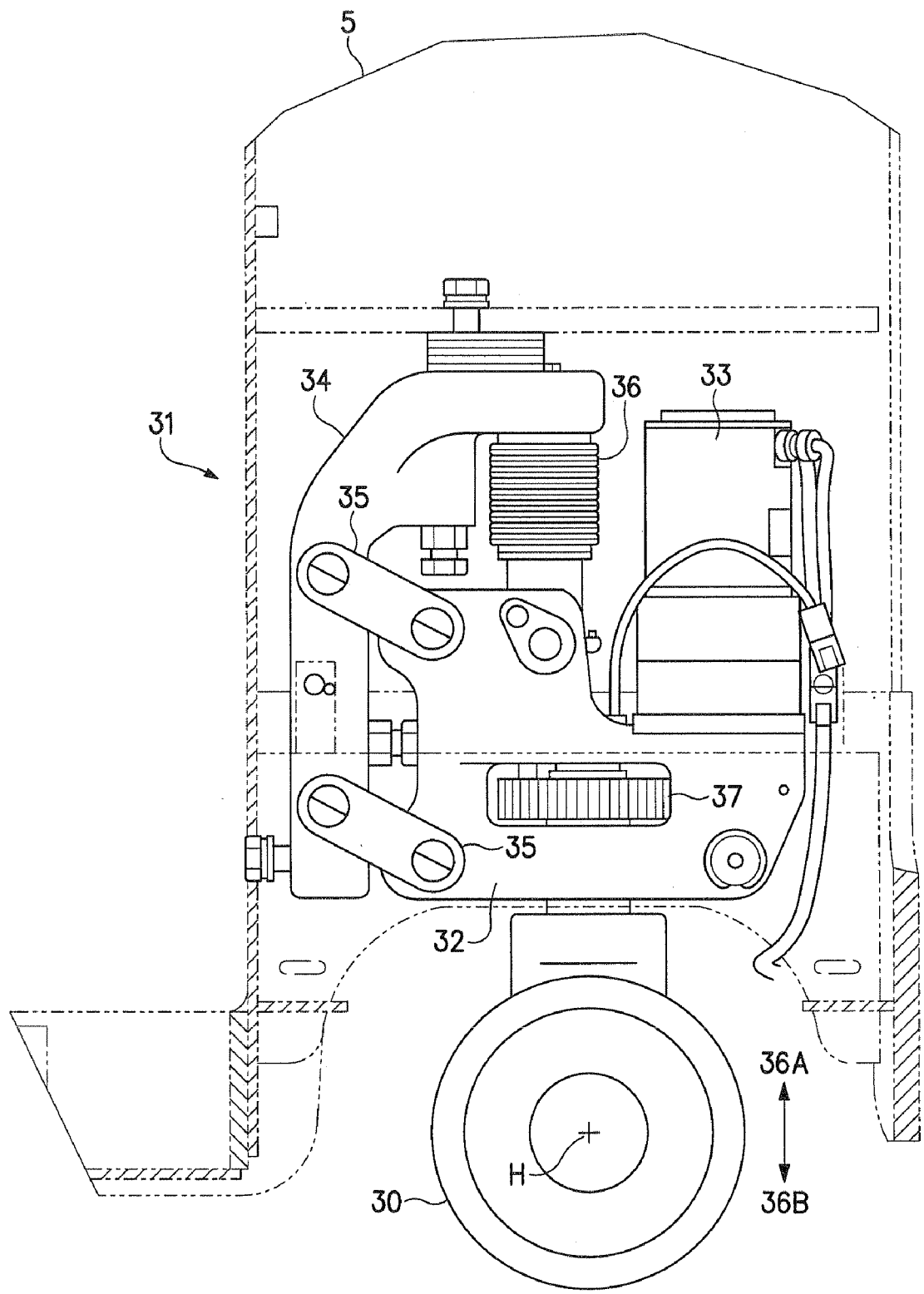
FIG. 3A is a partial side view of an electronically steered and sprung idler assembly taken with respect to a cross section of FIG. 2.

FIG. 3A is a partial view of an electronically steered and sprung idler assembly 31, including idler wheel 30, taken with respect to a cross section $I_0$-$I_0$ of FIG. 2. A frame of the vehicle 5 is shown in phantom line.

The idler wheel 30 is rotationally mounted to the bottom of a moving lower casting 32. A steer motor 33 is mounted on a top side of the moving lower casting 32. A gear assembly 37 transfers a steering force from the steer motor 33 to the idler wheel 30. The moving lower casting 32 is connected to a fixed upper casting 34 via a four bar linkage system 35. Movement of the moving lower casting 32 may be controlled by a spring pack assembly 36 mounted intermediate the moving lower casting 32 and the fixed upper casting 34. The spring pack assembly 36 may be supported by the fixed upper casting 34 via a thrust bearing (not shown). The fixed upper casting 34 may be bolted or otherwise rigidly attached to the vehicle frame 5. The spring pack assembly 36 may provide compressive resistance to a vertical movement 36A-36B of the idler wheel 30. The vertical movement of the idler wheel 30 may be provided via the four bar linkage system 35 connecting the lower and upper casting 32, 34. An end view of the horizontal axis of rotation H of the idler wheel is provided for illustrative purposes.

Figure 3B:
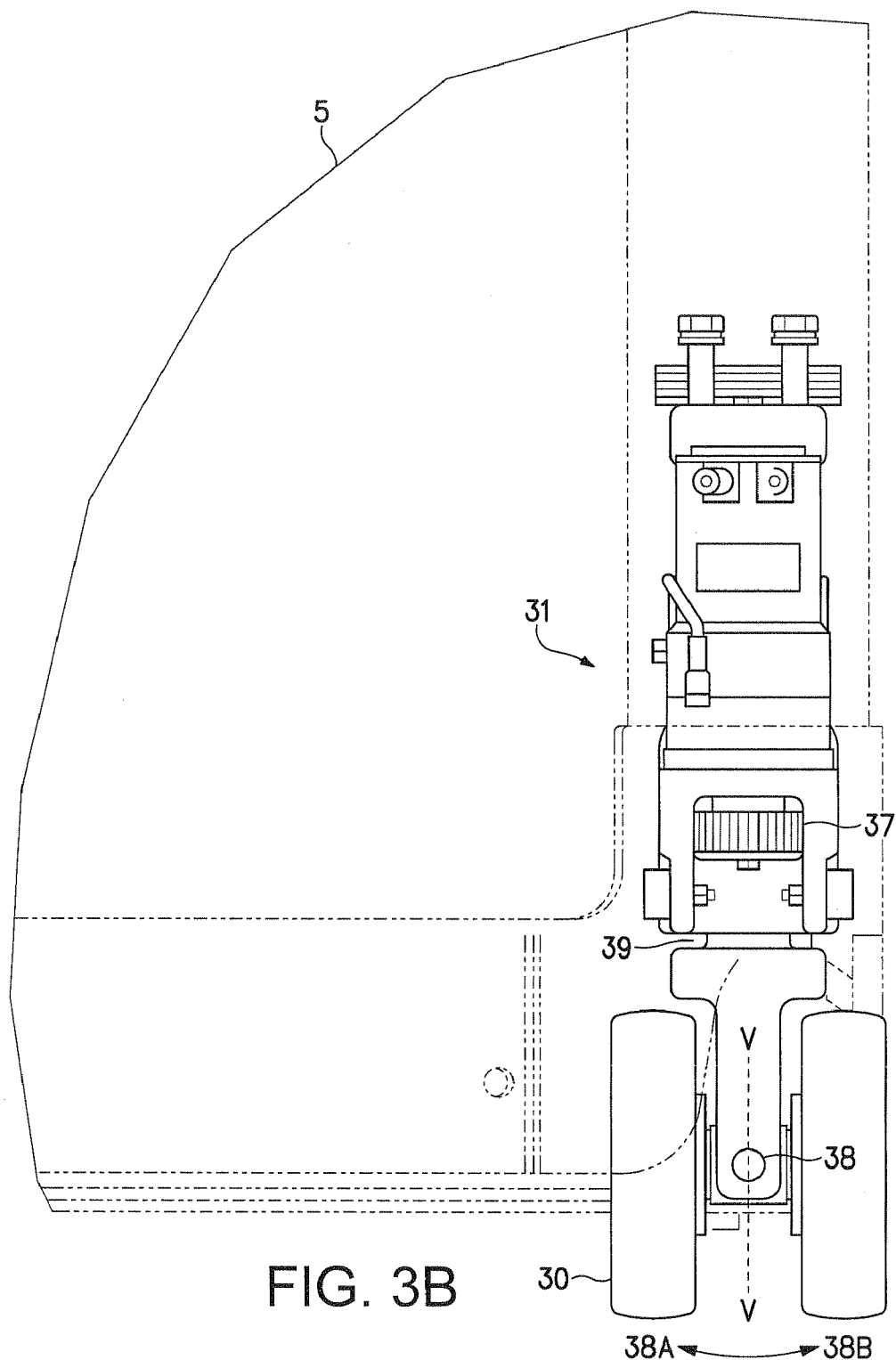
FIG. 3B is a partial end view of the electronically steered and sprung idler assembly of FIG. 3A.

FIG. 3B is a partial end view of the electronically steered and sprung idler assembly 31 of FIG. 3A. The idler wheel 30 is shown connected to the gearing assembly 37 via a rotational bearing element 39 which provides a vertical axis of rotation of the idler wheel 30 when it is being turned or steered. The idler wheel 30 is illustrated as including two wheels, but may include a single wheel or roller for example. The idler wheel 30 includes a pivot 38 which allows the idler wheel 30 to rotate about the pivot 38 in a side to side motion, illustrated as pivot arc 38A-38B. Pivot 38 allows the idler wheel 30 to maintain maximum contact with the ground as it travels over an obstacle or as the vehicle 5 is turning a corner. The vertical axis of rotation V of the idler wheel 30 is illustrated as passing through the pivot 38.

Figure 3C:
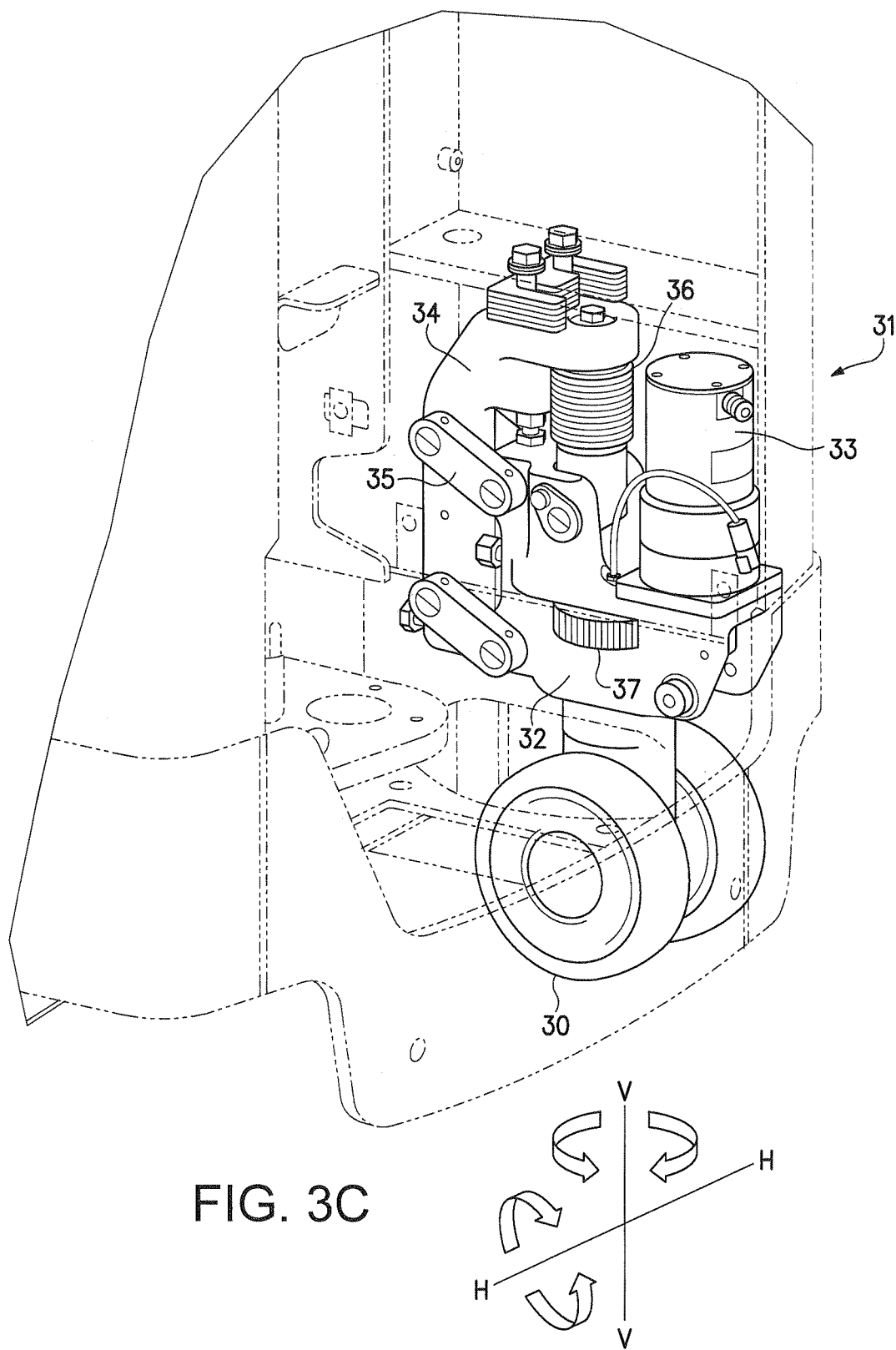
FIG. 3C is a perspective view of the electronically steered and sprung idler assembly of FIGS. 3A and 3B, illustrating multiple axes of rotation.

FIG. 3C is a perspective view of the electronically steered and sprung idler assembly 31 of FIGS. 3A and 3B, illustrating multiple axes of rotation. The perspective view provides additional detail of the idler wheel 30, lower casting 32, steer motor 33, gear assembly 37, upper casting 34, four bar linkage system 35, and the spring pack assembly 36. The horizontal axis of rotation H and vertical axis of rotation V illustrated in FIGS. 3A and 3B, respectively, are shown together in FIG. 3C for clarity. The idler wheel 30 may rotate about either axis H, V in a first direction of rotation, and a second direction of rotation opposite the first. The horizontal axis of rotation H and vertical axis of rotation V are shown as intersecting, such that they are not offset from each other.

The electronically steered and sprung idler wheel assembly 31 may be used on a narrow aisle reach truck to improve vehicle performance, reduce assembly constraints, and increase operating efficiency as compared to mechanically steered idler assemblies including mechanical linkages. The electronically steered and sprung idler wheel assembly 31 may be operated in conjunction with a powered steered drive wheel, such as drive wheel 90 of FIG. 1.

The electronically steered and sprung idler wheel assembly 31 offers a more compact design compared to trucks equipped with an articulating axle, which require substantial structure to support the loads. Less clearance space is needed for the electronically steered and sprung idler wheel assembly 31 by eliminating the articulating axle structure and the associated clearance room for an axle to rotate underneath the operator compartment. With the additional space provided in the vehicle 5, a drive wheel compartment width can be reduced so that the operator floor plate 4 of FIG. 1 can be lowered. This provided additional space within the operator compartment 2 and also reduced required step height to enter the compartment 2, facilitating operator ingress and egress.

In one embodiment, the four bar linkage system 35 and spring pack assembly 36 of the idler wheel assembly is replaced with an articulating axle structure to provide vehicle suspension, while still retaining the steer motor 33 to electronically steer the idler wheel 30.

The electronically steered and sprung idler wheel assembly 31 also improves vehicle performance by reducing vehicle side movements during travel reversals commonly found with self-steered casters. A self-steered caster includes a wheel or caster having a horizontal axis of rotation that is offset from the vertical axis of rotation. Because of this wheel offset, the caster's horizontal axis of rotation dynamically rotates about the vertical axis of rotation due to moment loading until the caster is trailing the direction of travel. Narrow aisle reach trucks may drive substantially equal amounts of time in both forward and reverse directions. A common operation while handling pallets in racks is for the operator to reverse direction of travel of the vehicle 5. As the reach truck reverses direction, the self-steered caster rotates 180 degrees to maintain a trailing position. Due to the offset in the caster axes of rotation, the reach truck moves sideways during rotation of the caster. The move sideways affects the entire vehicle and operator, and requires additional support and effort to maintain control. A side movement of the lower vehicle chassis can induce an amplified sway in the load at an elevated height. Excessive sway increases the operator's perception of instability. The electronically steered and sprung idler wheel assembly 31 eliminates these problems by maintaining a positive control of the idler wheel 30. By maintaining a positive control of the idler wheel 30 during steering operations, the horizontal axis of rotation H and the vertical axis of rotation V of the idler wheel do not need to be offset. In addition, the electronically steered and sprung idler wheel assembly 31 provides additional lateral vehicle support during cornering and wet floor operation.

By mounting the steer motor 33 directly to the electronically steered and sprung idler wheel assembly 31, mechanical linkage between the drive wheel 90 and idler wheel 30 is eliminated. Utilizing electronic steering control of the idler wheel 30 provides a fixed mechanical advantage and removes friction and geometry losses found in mechanically steered systems. The steering force or torque used to turn the idler wheel 30 is constant and independent of the position of the idler wheel 30. The electronically steered and sprung idler wheel assembly 31 may be located independently or physically removed from the drive wheel 90 which allows additional design alternatives and simplifies vehicle assembly. Because the electronically steered and sprung idler wheel assembly 31 is not limited by mechanical linkage, it and can be rotated to a zero turn or over-steer position in both directions of vehicle rotation, as is described further herein. This provides reduced vehicle turning radius and improved narrow aisle operation.

Figures 4, 5:
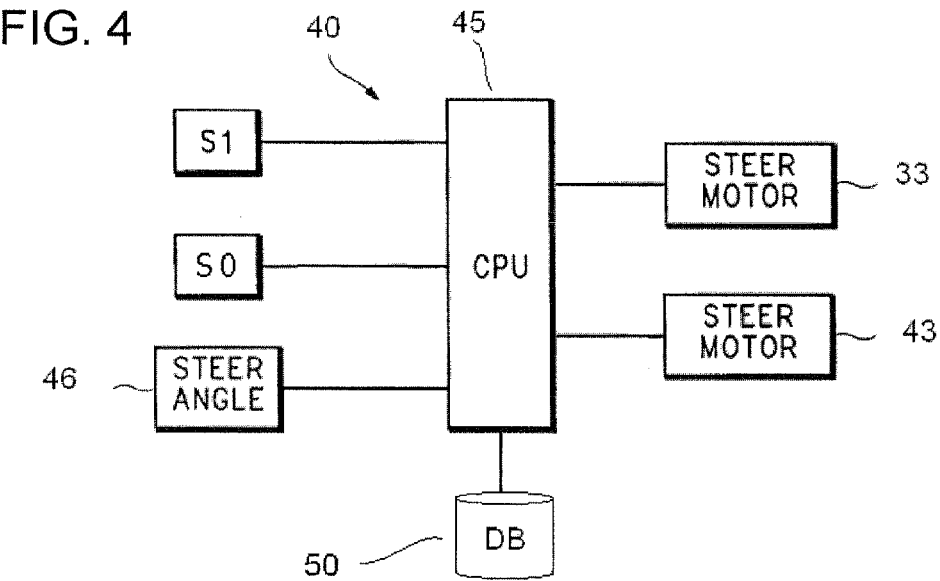
FIG. 4 is a simplified block diagram illustrating an example electronic steering system.
FIG. 5 is a table illustrating example data points for an electronic steering system including a drive wheel and an idler.

FIG. 4 is a simplified block diagram illustrating an example electronic steering system 40. The electronic steering system 40 includes an electronic controller 45 in communication with one or more steer motors 33, 43. The controller 45 may be a dedicated processor or part of a centralized vehicle system manager (VSM) including a CAN bus network. Steer motor 33, also shown in FIG. 3A, may be used to provide power for rotating or steering the idler wheel 30. Steer motor 43 may be used to provide power for rotating or steering the drive wheel 90 of FIG. 1.

A steered or angular position of the drive wheel 90 and the idler wheel 30 may be controlled electronically by the controller 45. At start up of the vehicle 5, with reference to FIG. 1, the steering apparatus 20, drive wheel 90 and idler wheel 30 may be centered or reset to neutral by one or more proximity sensors that identify a target position. The position of the drive wheel 90 may be commanded by an operator input through the steering apparatus 20. A steering request 46 may be transmitted from the steering apparatus 20 to the controller 45 of FIG. 4. The steering request 46 may include an amount of applied force or rate of rotation of the steering apparatus 20. In one embodiment, the steering request 46 includes an absolute position of the steering apparatus. The steering request 46 may be provided by an incremental encoder or an absolute encoder, as is known in the art. The position of the drive wheel 90 may be reported or transmitted to the controller 45 as data, for example over the CAN bus network, by a sensor or encoder S1. The encoder S1 may measure an angle of rotation of the drive wheel 90. The encoder S1 may be mounted on or near the steer motor 43. A further sensor or encoder S0 may also be provided to measure an angle of rotation of the idler wheel 30. Encoders S0, S1 may be used as proximity sensors for centering the wheels 30, 90 at vehicle startup In one embodiment, the idler wheel 30 is commanded to a steering position by the controller 45 based on values in a lookup data table 50. The controller 45 may determine a steering position of the idler wheel 30 by comparing the drive wheel steering angle input from encoder 51. In another embodiment, both steering angles for the idler wheel 30 and drive wheel 90 are looked up in the data table 50 according to the steering request 46.

FIG. 5 illustrates the data table 50 of FIG. 4 including example data points for the electronic steering system 40 including the drive wheel 90 and the idler wheel 30. The steer angle for the drive wheel 90 is identified as steering angle $\omega_1$, whereas the commanded steer angle for the idler wheel 30 is identified as steering angle of $\omega_0$. The positive values of $\omega_0$, $\omega_1$ indicate a right-hand or clockwise rotation of the wheels 30, 90. Whereas the negative values of $\omega_0$, $\omega_1$ indicate a left-hand or counterclockwise rotation of the wheels 30, 90. Encoder S0 of FIG. 4 may be used to measure, determine or confirm the steering angle $\omega_0$, and encoder S1 may be used to measure, determine or confirm the steering angle $\omega_1$. The data table 50, and similar data tables including other data points or steer angles, may be created using the following formulae, with additional reference to FIG. 2.

For Right-Hand (Clockwise) Turn With C>B $$\omega_0 = A \text{ TAN}(L/(C-B))$$

$$\omega_1 = A \text{ TAN}(L/(C+A))$$

For Right Hand Turn With $C \leqq B$ and $C \geqq$ zero $\omega_0 = A \ \text{TAN}((B-C)/L) + \pi/2$ $\omega_1 = A \ \text{TAN}(L/(C+A))$ For Left Hand (Counterclockwise) Turn With $C > A$ $\omega_0 = A \ \text{TAN}(L/(C+B))$ $\omega_1 = A \ \text{TAN}(L/(C-A))$ For Left Hand Turn With $C \leqq A$ and $C \geqq$ zero $\omega_0 = A \ \text{TAN}((A-C)/L) + \pi/2$ $\omega_1 = A \ \text{TAN}(L/(C-A))$ The controller 45 may receive real-time data or input from one or more of the encoders S0, S1 as well as the steering request 46 to determine steering angles $\omega_0$, $\omega_1$. In this manner, the vehicle turning radius RV, the idler wheel turning radius RI, and the drive wheel turning radius RS illustrated in FIG. 2 may continue to share the common radial center point $P_O$ even as the steering angles are $\omega_0$, $\omega_1$ being changed. In addition, the load wheel centerline $P_1$ may continue to intersect the common center point $P_O$ when the idler wheel 30 is commanded to steerably align with a steering angle $\omega_0$ corresponding to a different or changing radius of curvature.

FIG. 6A illustrates an example of controllably steering a vehicle 5 transporting a load 60 in a counterclockwise direction, with the vehicle 5 traveling in the aft direction opposite the load arms 11. Drive wheel 90 is shown aligned along a steering position Y-Y, corresponding to a minimum turning radius YR having a center point of curvature $P_O$. The center point of curvature $P_O$ associated with the minimum turning radius YR is located on the centerline CL of the vehicle 5. The idler wheel 30 (FIG. 2) is not shown in FIG. 6A for clarity of illustration, however one skilled in the art would appreciate that the idler wheel turning radius RI would also have as its radial center point the center point of curvature $P_O$ located on the vehicle centerline CL.

At the minimum turning radius YR identified by center point of curvature $P_O$ of FIG. 6A, the rear left corner V1 of the vehicle 5 would follow the trajectory Y1 as the vehicle 5 is rotated in the counterclockwise direction. The front left corner V2 of the load 60 would follow the trajectory Y2 as the vehicle 5 is rotated in the counterclockwise direction.

Trajectories X1 and X2 indicate the steerable path of the corners V1, V2 respectively when the vehicle 5 is being under-steered. In the under-steered condition, the drive wheel 90 is oriented along the steering position X-X, and the center point of curvature $P_O$ would be located in the positive direction (+) along the load wheel assembly centerline $P_1$ of FIG. 6A. Trajectories Z1 and Z2 indicate the steerable path of the corners V1, V2 respectively when the vehicle 5 is being over-steered. In the over-steered condition, the drive wheel 90 is oriented along the steering position Z-Z, and the center point of curvature $P_O$ would be located in the negative direction (−) along the load wheel assembly centerline $P_1$.

The drive wheel steering angle $\omega_1$ illustrated in FIG. 2 would vary as the drive wheel 90 is being rotated from a steer angle position associated with the minimum turning radius YR to a steer angle position associated with an over-steered turning radius ZR, or to a under-steered turning radius associated with steering position X-X. FIG. 6B illustrates an enlarged partial view of the vehicle 5 shown in FIG. 6A, including the drive wheel 90. A first steering angle $Z_0$ associated with the over-steered turning radius ZR may therefore exceed a second steering angle $Y_0$ associate with the minimum turning radius YR of the industrial vehicle 5. First and second steering angles $Z_0$ and $Y_0$ are shown applied to the drive wheel 90, and correspond to the drive wheel steering angle position $\omega_i$ of FIG. 2. First and second steering angles associated with a minimum turning radius and over-steered turning radius for the idler wheel 30 may also be understood as corresponding with the idler wheel steering angle position $\omega_0$ (FIG. 2), which may vary from the drive wheel steering angle position $\omega_1$. Therefore, both the idler wheel and drive wheel steering angle positions $\omega_0$ and $\omega_1$ may be increased beyond steering angles associated with the minimum turning radius YR, when an over-steered vehicle operation is requested. In one embodiment, the over-steered turning radius ZR is associated with a maximum allowable vehicle steering direction command.

With the electronically steered and sprung idler assembly 31 of FIG. 3 and the steering system of FIG. 4, a full zero turn or over-steer capability is attainable in either the clockwise or counterclockwise direction. This improves vehicle maneuverability when turning in narrow aisles. The electronically steered and sprung idler wheel assembly 31 allows the vehicle 5 to be over-steered in both clockwise and counterclockwise directions when traveling in either forward or reverse direction. This range of steering control is not achievable with steering systems including mechanical linkage.

Figure 7:
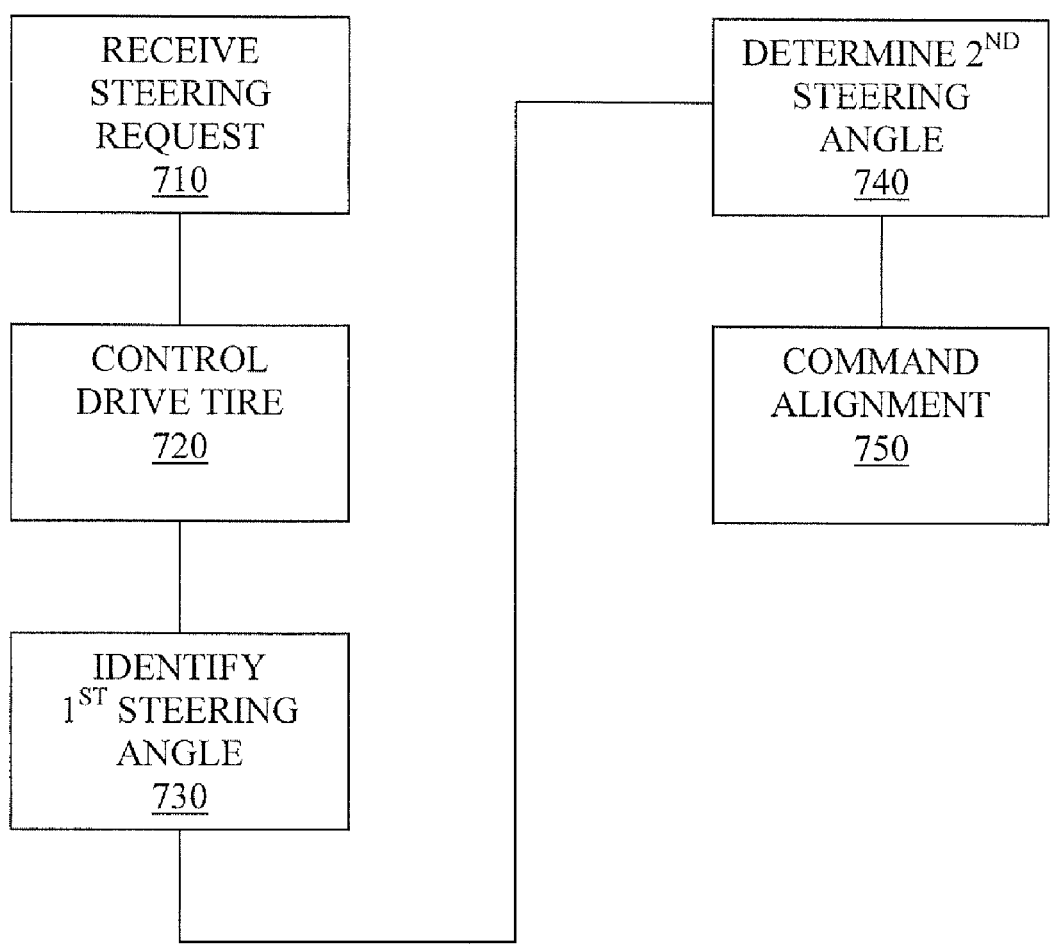
FIG. 7 illustrates a method of steering.

FIG. 7 illustrates a method of steering a vehicle, such as the vehicle 5 shown in FIG. 1. One or more of the operations illustrated in FIG. 7 may be performed by the controller 45 of FIG. 4. At operation 710, a steering request, such as steering request 46 of FIG. 4, is received. The steering request may be transmitted or requested by the steering apparatus 20 of FIG. 1.

At operation 720, a rotational position of a primary steer tire, such as drive wheel 90 of FIG. 1, is controlled according to the steering request 46. The steering request 46 may include input that identifies an amount of force applied to the steering apparatus 20 of FIG. 1, or a speed of rotation of the steering apparatus 20. In one embodiment, an absolute or rotational position of the steering apparatus 20 is determined and included in the steering request 46.

At operation 730, a first steering angle associated with the rotational position of the drive wheel 90 is identified. In one embodiment, the first steering angle is identifiable as steering angle $\omega_1$ of the drive wheel 90 shown in FIG. 2. The first steering angle may be associated with a first steering radius, such as drive wheel turning radius RS. The drive wheel 90 is shown as being aligned with the drive wheel steering direction line $S_1$ of FIG. 2. The horizontal axis of rotation of the drive wheel 90 is aligned with the drive wheel turning radius RS.

At operation 740, a second steering angle for a secondary steer tire, such as idler wheel 30 of FIG. 3, is determined or computed. The second steering angle is identifiable as steering angle $\omega_0$ of FIG. 2. In one embodiment, the second steering angle is computed from the steering request. In another embodiment, the steering angle of the primary steer tire is measured, and the second steering angle is computed from the measured steering angle. The second steering angle may be associated with a second steering radius, such as idler wheel turning radius RI.

At operation 750, the secondary steer tire is commanded to align with the second steering angle. For example, the idler wheel 30 is shown as being aligned with the idler wheel steering direction line $I_1$ of FIG. 2. The horizontal axis of rotation H of the idler wheel 30 is aligned with the idler wheel turning radius RI. The first and second steering radii, for example RS and RI, share a common radial center point $P_0$ illustrated in FIG. 2. The common radial center point $P_0$ may align with the lateral centerline $P_1$ of the vehicle load wheel assembly 7. In addition, the common radial center point $P_0$ may coincide with a steering radius RV of the vehicle 5, also illustrated in FIG. 2.

In one embodiment, the steering radius RV of the vehicle identifies a zero turn or minimum turning radius YR characterized in that the vehicle rotates about a central pivot point, such as the center point of curvature $P_0$ of FIG. 6A, located on the centerline CL of the vehicle 5. In another embodiment, the first and second steering radii RS and RI (FIG. 2) continue to share the common radial center point $P_0$ during an over-steer operation of the vehicle 5, where the location of the center point $P_0$ may be located at varying positions along the load wheel centerline $P_1$. The alignment of the drive wheel 90 and the idler wheel 30 can be actively oriented or aligned such that the first and second steering radii RS and RI continue to share the common radial center point $P_0$ through a full steering range of the vehicle 5 including the vehicle over-steer operation.

The system and apparatus described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or diagrams. This is not necessary, however, and there may be cases where these functional blocks or diagrams are equivalently aggregated into a single logic device, program or operation with unclear boundaries.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A steering system for an industrial vehicle comprising:
   a drive wheel configured to steerably align with a first radius of curvature;
   an electronically controlled idler wheel configured to steerably align with a second radius of curvature different than the first radius of curvature;
   a controller configured to command the electronically controlled idler wheel to steerably align with the second radius of curvature according to a determination of the first radius of curvature, wherein the first radius of curvature and the second radius of curvature share a common center point of turning radius, and wherein the common center point of turning radius identifies a minimum turning radius steering operation such that the industrial vehicle pivots about an axis of rotation passing through a longitudinal centerline of the industrial vehicle; and
   a load wheel assembly having a load wheel centerline, wherein during the minimum turning radius steering operation the load wheel centerline intersects the longitudinal centerline at the common center point.

2. The steering system according to claim 1, wherein the load wheel centerline continues to intersect the common center point when the electronically controlled idler wheel is commanded to steerably align with a different radius of curvature.

3. The steering system according to claim 1, wherein an over-steered turning radius is associated with a first steering angle that exceeds a second steering angle associated with the minimum turning radius steering operation of the industrial vehicle, and wherein the controller is further configured to command the electronically controlled idler wheel to steerably align with the over-steered turning radius.

4. The steering system according to claim 3, wherein the over-steered turning radius is associated with a maximum allowable vehicle steering direction command.

5. The steering system according to claim 1, further comprising a steering sensor configured to measure an angle of rotation of the drive wheel, wherein the steering sensor is further configured to transmit the angle of rotation as data to the controller.

6. The steering system according to claim 5, further comprising a steer angle lookup table, wherein the controller looks up an angle of rotation of the electronically controlled idler wheel corresponding to the data transmitted to the controller.

7. The steering system according to claim 1, wherein the longitudinal centerline of the vehicle is oriented approximately perpendicular to a drive wheel centerline intersecting both the drive wheel and the electronically controlled idler wheel.

8. A method of steering a vehicle, comprising:
   identifying a first steering angle position of a primary steer tire located on a first side of the vehicle, wherein the first steering angle position is associated with a first steering radius;
   computing a second steering angle position for a secondary steer tire located on a second side of the vehicle opposite the first side, wherein the second steering angle position is associated with a second steering radius; and
   commanding the secondary steer tire to align with the second steering angle position, wherein the secondary steer tire is commanded by a controller, and wherein during a minimum turning radius of the vehicle:
      the first steering radius and the second steering radius share a common radial center point lying on a longitudinal centerline of the vehicle; and
      the common radial center point aligns with a lateral centerline passing through a load wheel assembly of the vehicle, wherein the lateral centerline is oriented perpendicular to the longitudinal centerline.

9. The method according to claim 8, further comprising commanding the primary steer tire to align with the first steering angle position in response to a steering request from a vehicle steering apparatus.

10. The method according to claim 9, wherein the second steering angle position is computed from the steering request.

11. The method according to claim 8, further comprising measuring a steering angle of the primary steer tire, wherein the second steering angle position is computed from the measured steering angle.

12. The method according to claim 8, wherein the lateral centerline passes through both a left side load wheel assembly and a right side load wheel assembly of the vehicle.

13. The method according to claim 8, wherein the common radial center point coincides with a steering radius of the vehicle mounted on the primary and secondary steer tires.

14. The method according to claim 13, wherein the steering radius of the vehicle identifies the minimum turning radius, and wherein the vehicle rotates about the common radial center point.

15. The method according to claim 14, further comprising increasing the first and second steering angle positions beyond the minimum turning radius, wherein the first steering radius and the second steering radius continue to share the common radial center point.

16. The method according to claim 8, wherein the longitudinal centerline is oriented approximately perpendicular to a steer tire centerline which passes through both the primary and secondary steer tires.

17. An apparatus, comprising:
- means for receiving a steering request for a vehicle;
- means for controlling a rotational position of a drive wheel;
- means for identifying a first steering angle associated with the rotational position of the drive wheel, wherein the first steering angle is further associated with a first steering radius;
- means for determining a second steering angle for an idler wheel, wherein the second steering angle is associated with a second steering radius; and
- means for commanding the idler wheel to align with the second steering angle, wherein the first steering radius and the second steering radius share a common radial center point, and wherein during a minimum turning radius steering operation of the vehicle:
  - the common radial center point lies on a longitudinal centerline of the vehicle; and
  - a load wheel centerline of the vehicle intersects the longitudinal centerline at the common radial center point.

18. The apparatus according to claim 17, wherein the second steering angle associated with the rotational position of the idler wheel is determined from the steering request.

19. The apparatus according to claim 17, further comprising means for measuring a real-time steering angle of the drive wheel, wherein the second steering angle is determined from the measured steering angle.

20. The apparatus according to claim 17, further comprising means for actively orienting the rotational position of the drive wheel and the idler wheel such that the first steering radius and the second steering radius share the common radial center point through a full steering range of the vehicle including a vehicle over-steer operation.

21. The apparatus according to claim 17, wherein the longitudinal centerline of the vehicle is oriented approximately perpendicular to an axis of rotation of the drive wheel when the first steering angle indicates a zero degree steering angle.

* * * * *